United States Patent [19]

Kubota

[11] Patent Number: 4,565,955
[45] Date of Patent: Jan. 21, 1986

[54] SYNCHRONOUS MOTOR DEVICE FOR TIMEPIECE

[75] Inventor: Susumu Kubota, Saitama, Japan

[73] Assignee: Rhythm Watch Co., Ltd., Tokyo, Japan

[21] Appl. No.: 544,395

[22] Filed: Oct. 21, 1983

[30] Foreign Application Priority Data

Oct. 29, 1982 [JP] Japan .................................. 57-190628

[51] Int. Cl.$^4$ ....................... H02K 29/64; H02K 21/00
[52] U.S. Cl. ............................... 318/696; 310/40 MM; 310/162
[58] Field of Search .............. 310/162, 49 R, 40 MM; 318/696, 254, 138; 368/157

[56] References Cited

U.S. PATENT DOCUMENTS

| | | | |
|---|---|---|---|
| 4,214,181 | 7/1980 | Nagahori ...................... | 310/40 MM |
| 4,368,990 | 1/1983 | Ueda et al. ............................ | 318/696 |
| 4,386,287 | 5/1983 | Karasawa et al. ................... | 310/162 |
| 4,437,769 | 3/1984 | Shiaa et al. ............................ | 318/696 |
| 4,456,866 | 6/1984 | Xuan et al. ............................ | 318/696 |
| 4,460,282 | 7/1984 | Kanno ................................. | 318/696 |

FOREIGN PATENT DOCUMENTS

| | | | |
|---|---|---|---|
| 153557 | 9/1982 | Japan ............................ | 310/40 MM |
| 150393 | 3/1983 | Japan . | |

Primary Examiner—David Smith, Jr.
Attorney, Agent, or Firm—Koda and Androlia

[57] ABSTRACT

A synchronous motor device for a timepiece including a synchronous motor for the timepiece having a rotor with a pair of magnetized rotor poles around its circumference, a stator consisting of a pair of stator plates with a plurality of stator poles arranged around the vicinity of said rotor separated by an air gap, and an energizing coil supplying alternating magnetic flux to said stator.

The synchronous motor for timepiece includes main stator poles, first supplementary stator poles and second supplementary stator poles.

The main stator poles are further provided with both of the stator plates at the facing position against the rotor shaft and mainly forms the static stable position of the rotor. The first supplementary stator poles are facingly positioned against the rotor shaft and provided with both of the stator plates at separate positions from said main stator poles. This first supplmentary stator poles form the dynamic stable position of the rotor in the cooperation with the main stator poles and have wider gaps than the main stator poles. The second supplementary stator poles are facingly positioned against the rotor shaft and provided in the vicinity of the dynamic stable position of the rotor in order to place the predetermined braking force on the rotor which rotates over the dynamic stable position. This second supplementary stator poles have wider air gaps than the main stator poles and the first supplementary stator poles. Consequently the synchronous motor can achieve the properties of smooth self-starting rotation.

5 Claims, 16 Drawing Figures (a) DRIVE PULSES (b) ELECTRIC CURRENT WAVEFORM

SYNCHRONOUS MOTOR DEVICE FOR TIMEPIECE

BACKGROUND OF THE INVENTION

1. Field of the Invention

The present invention relates to a synchronous motor device for timepiece, and in particular to a synchronous motor device for timepiece which converts an alternating electric signal from a time signal generating means to mechanical movement of constant speed rotation.

2. Description of the Prior Art

In order to convert time generating signals of pulse waves, etc. supplied by an AC commerical power source, crystal oscillator, or the other oscillating means with a highly accurate frequency to mechanical rotation of time indicating hands, various synchronous motors for timpieces find wide utility in analog type display timepieces with accuracy. For this type of synchronous motor device small electric power consumption and reliable self-starting properties are demanded. The conventional synchronous motor, however, could not completely meet these demands.

In the prior art devices many kinds of attempts have been made to improve the properties of power consumption and self-starting rotation, wherein, in ordinary cases, the requested properties have been improved by modification of the shapes of stator poles which receive the alternating electric signal.

In the prior art devices with improved synchronous motors for timepiece, formations of a plurality of magnetized stator poles having different air gaps between stator poles and a rotor separately determines the static magnetic center of the stator (static stable position of the rotor) and the dynamic magnetic center (dynamic stable position of the rotor), which enables preferable self-starting rotation with less power consumption.

Such prior art devices mentioned above can provide preferable properties which cannot be obtained from a stator always having a fixed air gap.

In the prior art devices of such kind, however, there arises such a problem that the driving force for rotation obtained from the stator in accordance with rotating position of the rotor changes one time after another in complexity, and the consequent rotor rotation with pulsation causes inability to obtain smooth rotation and particularly smooth self-starting rotation.

In order to prevent the rotor from rotation with pulsation, one mechanically absorbs the pulsation by a damper connected to the rotor shaft, but this means causes a small increase of mechanical loss in operation and low productivity in assembling process.

An electric improvement can be offered to delete such pulsation in rotation of the rotor on the other hand. For example, according to Japanese Pat. No. 56-53274, the pulsating components are decreased and the rotor rotation is stabilized by such means that the alternating electric signal shown by A in FIG. 1 is converted to an electric signal of complicated shapes shown by B in FIG. 1 and a control pulse 500 is provided to the rotor at the final stage of the respective drive pulses.

In this prior art device, however, there arises such a problem that the circuits must be very complex in order to form the pulse signal as is shown by B in FIG. 1.

SUMMARY OF THE INVENTION

Accordingly, it is a general object of the present invention to provide a synchronous motor device for a timepiece with simple composition which simply decreases pulsation of a rotor with preferable motor efficiency and less electric power consumption by slight modification to the stator pole structure.

In keeping with the principles of the present invention, the object is accomplished with a synchronous motor device for timepiece including a synchronous motor for timepiece having a rotor with a pair of magnetized rotor poles around its circumference, a stator consisting of a pair of stator poles having a plurality of stator poles arranged around the vicinity of said rotor separated by an air gap, and an energizing coil supplying alternating magnetic flux to the stator, wherein the synchronous motor for the timepiece includes main stator poles being prepared with both of the stator poles at the facing position against the rotor shaft and mainly forming static stable position of the rotor, first supplementary stator poles being facingly positioned against the rotor shaft, being prepared with both of the stator plates at the separate positions from the main stator poles, forming the dynamic stable position of the rotor with the cooperation of the main stator poles and having wider airgaps than the main stator poles, and second supplementary stator poles being facingly positioned against the rotor shaft, being provided in the vicinity of the dynamic stable position of the rotor in order to place a predetermined braking force on the rotor which rotates over the dynamic stable position, having wider air gaps than the main stator poles and the first supplementary stator poles, whereby smooth self-starting rotation can be achieved.

Furthermore, the object of the present invention is also accomplished with a synchronous motor device for timepiece including a synchronous motor for timepiece having a rotor with a pair of magnetized rotor poles around its circumference, a stator consisting of a pair of stator poles having a plurality of stator poles arranged around the vicinity of the rotor separated by an air gap, and an energizing coil supplying alternating magnetic flux to the stator, wherein the synchronous motor for timepiece includes main stator poles being prepared with both of the stator poles facing forward the rotor shaft and mainly forming the static stable position of the rotor, first supplementary stator poles facing forward the rotor shaft, being prepared with both of the stator plates at the separate positions from the main stator poles, forming the dynamic stable position of the rotor with the cooperation of the main stator poles and having wider air gaps than the main stator poles, and second supplementary stator poles facing forward the rotor shaft, being provided in the vicinity of the dynamic stable position of the rotor in order to place a predetermined braking force on the rotor which rotates over the dynamic stable position, having wider air gaps than the main stator poles and the first supplementary stator poles, and further, a synchronous motor device for timepiece comprising a detector detecting the time of the synchronous motor for timepiece starting and, since then for a certain period, driving the synchronous motor for timepiece at constant speed rotation by the drive pulses with wider pulse width than normal pulse width and further gradually decreasing at steps the pulse width of the drive pulses generated within a certain period after the motor starting its rotation into the pulse width of the normal drive pulses within the region of not exceeding 20 percent of the widest pulse width among the supplied drive pulses.

DETAILED DESCRIPTION OF THE EMBODIMENT

Figure 2:
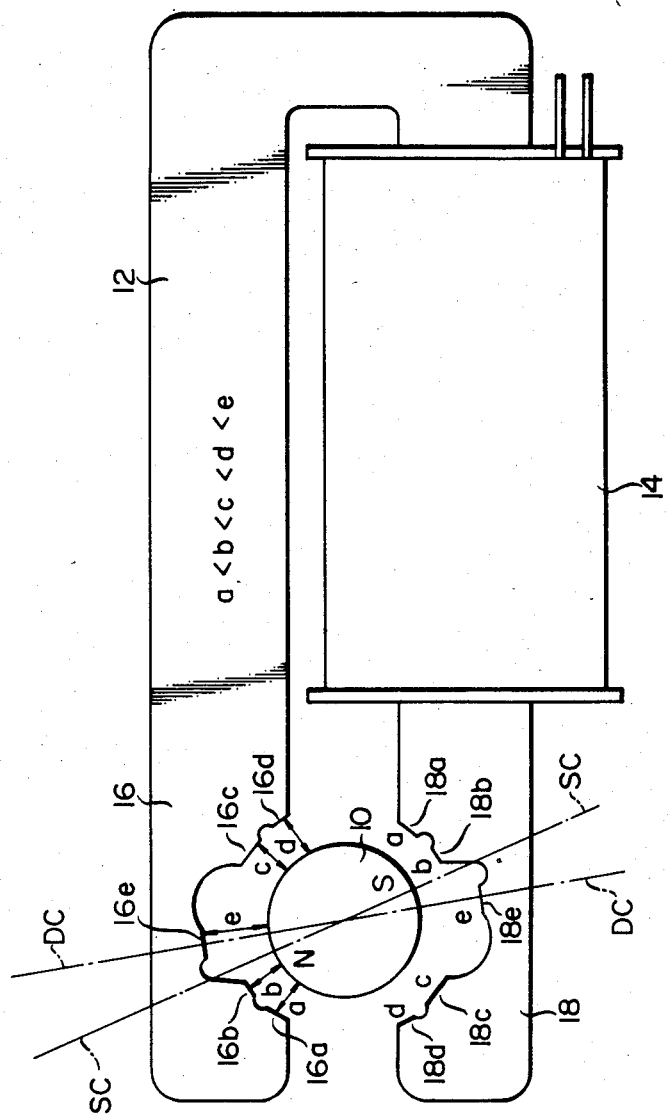
FIG. 2 is an illustration which shows composition of a preferred embodiment of a synchronous motor device for timepiece in accordance with the teachings of the present invention.

In FIG. 2 shown therin is a preferred embodiment of a synchronous motor for timepiece in accordance with the teachings of the present invention, wherein included is a rotor 10 which is geared and coupled with a time indicating gear train of timepiece, not illustrated, and a coil 14 which energizes a stator providing magnetic driving force to the above mentioned rotor 10. This rotor 10 has a pair of magnetized rotor poles N and S on the sides of its circumference, and the stator 12 consists of a pair of stator plates 16 and 18 having a plurality of stator poles which are arranged around the vicinity of the rotor 10 with air gap.

As generally known, the rotor 10 is driven to rotate in a predetermined direction, when a requested alternating magnetic flux is supplied to the stator 12 being arranged around the rotor 10 to produce magnetic attraction or repulsion for or against this magnetic flux. At this time, establishment of the respective magnetic pole numbers and alternating frequency into a certain value enables the requested self-starting and smooth continuous speed rotation afterwards.

As previously mentioned, the synchronous motor requires smoothness in its self-starting rotation at least, and this smoothness in the self-starting rotation provides stable rotating operation with a little electric power consumption.

In order to respond to the above mentioned demand this present invention is characterized in the arrangement of the stator poles which are provided with the stator plates 16 and 18 consisting of three stator poles consisting of main stator poles, first supplementary poles and second supplementary poles.

In the illustrated poles, the main stator poles consist of divided main stator pole pairs 16a–16b and 18a–18b arranged in the opposite position each other against a rotor shaft. In other words, a pair of stator poles 16a–18a are arranged in the position across from each other against the rotor shaft on the respective stator plates 16 and 18. Furthermore, the other pair of stator poles 16b–18b are also arranged in a position across from each other against the rotor shaft in the adjacent area to the above mentioned pair of stator poles 16a–18a. These two pairs of stator poles 16a–18a and 16b–18b can be basically considered as one pair of the stator poles, and they can be formed as one pair of main stator poles in the present invention. In this embodiment, however, the divided main stator poles can provide more smooth self-starting rotation in the operation which will be hereinafter described.

In this embodiment, the main stator pole 16a is provided on the side of the open end of one stator plate 16, and the main stator pole 18a is positioned on the coil side of the other main stator plate 18. The air gaps of the divided main stator pole pair are established most narrow to the rotor 10 in comparison with the ones of the other stator poles, whereby this divided pair of the main stator poles 16a–18a has the largest magnetic coupling force to the rotor 10.

Furthermore, the other divided pair of the main stator poles 16b–18b has a little larger air gaps than the above mentioned divided main stator poles 16a–18a, but these air gaps are established smaller than the other supplementary stator poles. Therefore, the static stable position of the rotor 10 is mainly formed by cooperation of both divided pairs of the main stator poles 16a–18a and 16b–18b.

The static stable position of the rotor 10 is totally determined by composition of the magnetic pole of the rotor 10 and the magnetic pole of the stator 12, and it is impossible to determine this position by ignorance of the supplementary stator poles which will be hereinafter descried. In FIG. 2 the static stable position consequently obtained is shown with a chain line SC.

On the other hand, in order to provide initial oscillation from a standstill position to obtain the self-starting action for the rotor 10 with cooperation of the above mentioned main stator poles, this kind of rotor generally has supplementary stator poles apart from the main stator poles.

In the present invention, the supplementary poles include the first supplementary stator poles so that the self-starting properties can be mainly provided. The first supplementary stator poles are arranged to face each other against the rotor shaft and provided on both of the stator plates 16 and 18 at a separate position from the above mentioned main stator poles.

In this embodiment, these first supplementary stator poles are also formed as the divided poles, In the figures the first supplementary poles are formed by pairs of the divided poles 16c–16d and 18c–18d respectively providing on the open side of the stator plate 16 and on the coil side of the stator plate 18. In the present invention, the pairs of this stator supplementary poles 16c–18c and 16d–18d are established to have further wider air gaps than the previously mentioned main stator poles, and the pair of the divided stator poles 16d–18d is established to have wider air gaps than the other pair of the divided stator poles 16c–18c.

The pairs of the divided stator poles 16c–18c and 16d–18d, therefore, form the dynamic stable position of the rotor 10 by cooperation with the main stator poles and this dynamic stable position is shown with a DC in the embodiment. It is understood that this dynamic stable position DC is settled at the position moved clockwise away from the afore-mentioned static stable position SC at a certain angle and this deviation of the angle can provide the requested self-starting action.

Figure 3:
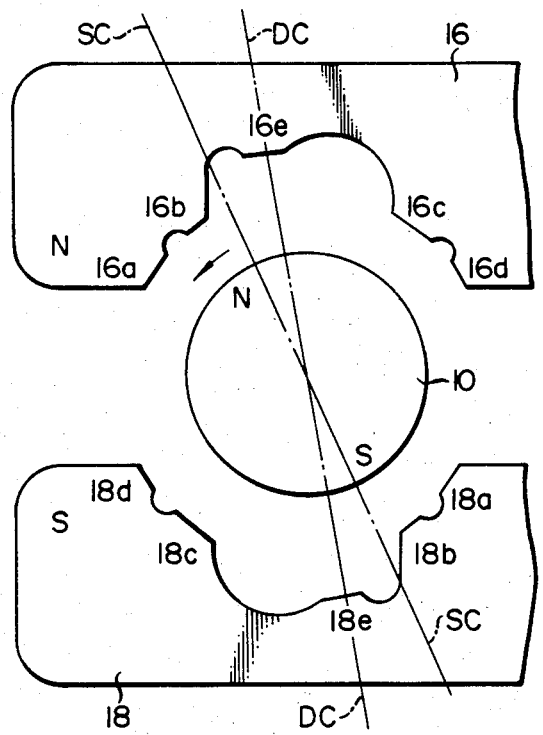
FIGS. 3 through 6 are illustrations showing the respective operations of the embodiment in FIG. 2.
Figure 4:
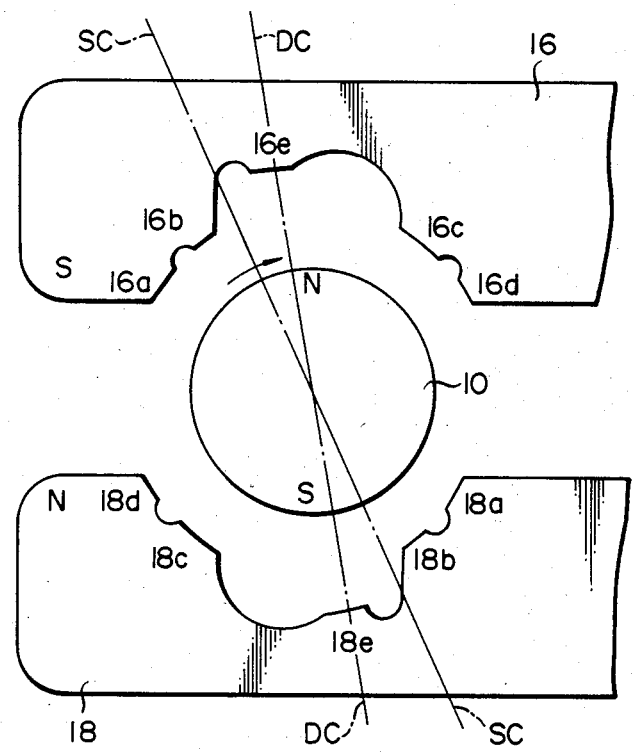

In other words, the rotor poles of the rotor 10 are stabilized at the standstill position which coincides with the static stable position SC as is shown in FIG. 2 before the pulse signal is applied to the energizing coil 14. When the energizing coil 14 is supplied with the alternating electric current so that the stator plate 16 becomes the N pole and the stator plate 18 becomes the S pole, the rotor 10 starts to slightly rotate to either direction from the static stable position SC, for example, to slightly rotate counterclockwise as is shown in FIG. 3. At this starting time the rotor 10 rotates at a slight angle since the inertia of the rotor is comparatively high. When the energizing direction of the coil 14 is inverted next so that the stator plate 16 becomes the S pole and the stator plae 18 becomes N poles as is shown in FIG. 4, the rotor 10 starts to rotate reversely from the position with the angle as is shown in FIG. 3 to the clockwise direction.

Figure 5:
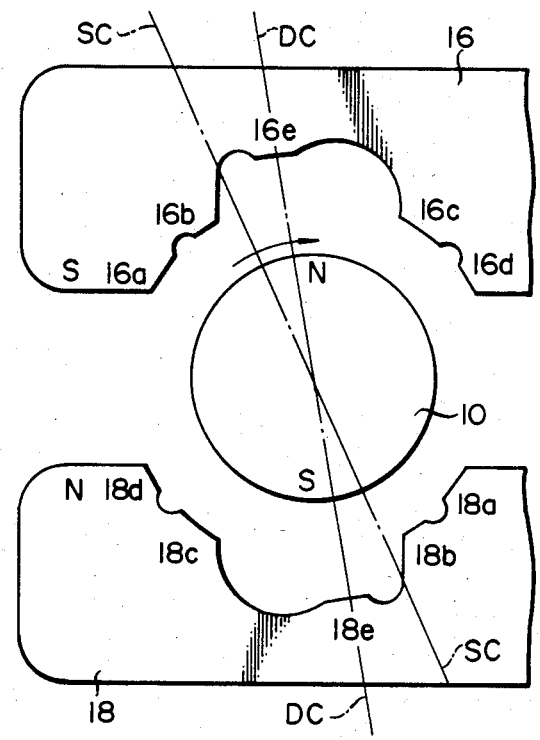
Figure 6:
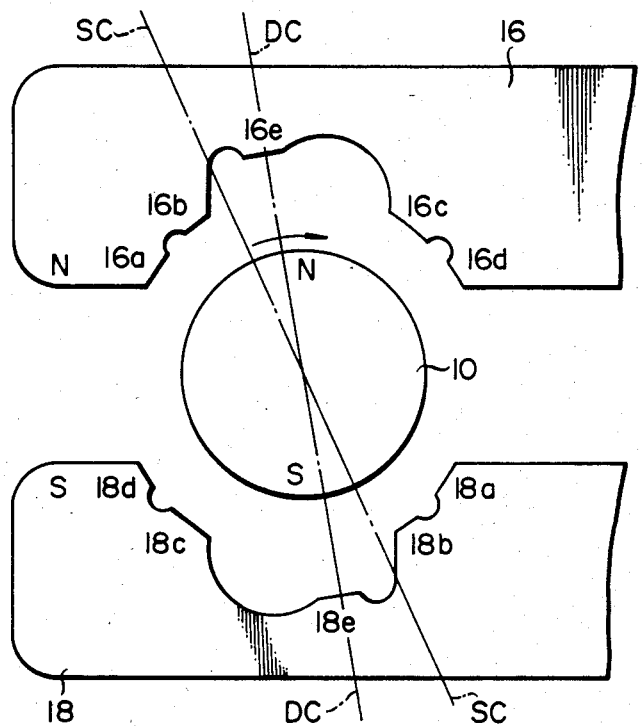

The above mentioned reciprocating rotation grows with oscillation upon application of the alternating signal to the energizing coil 14. When the rotor poles of the rotor 10 rotates to pass over the dynamic stable position DC at a certain time as is shown in FIG. 5 and the magnetic poles are inverted next, the rotor 10 continuously rotates clockwise. Rotation of the rotor 10 rapidly reaches a stable speed and, since then, continues on in accordance with the alternating signal of the stator 12. The synchronous rotation is thus started promptly.

As mentioned heretofore, establishment of a certain angular deviation at the static stable position SC and the dynamic stable position DC of the rotor 10 makes it possible to accomplish the requested self-starting rotation. In the present invention, furthermore, in order to perform smooth rotation at self-starting time, it is required that the second supplementary stator poles are provided on the stator 12 in the vicinity of the dynamic stable position to provide a certain braking force to the rotor 10.

Figure 1:
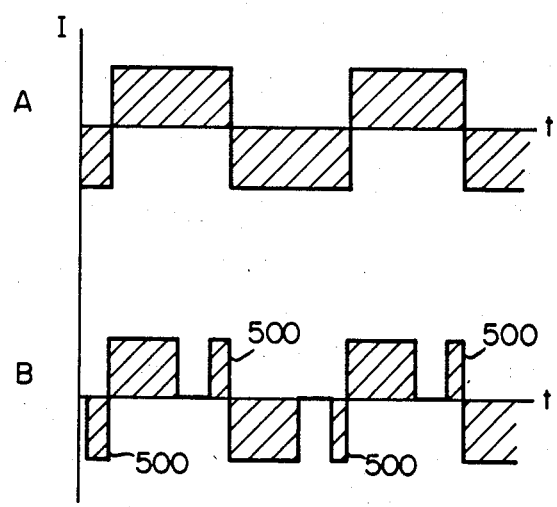
FIG. 1 A and B is a waveform chart showing alternating electric signals for the conventional motor drive.

In FIG. 2 the second supplementary stator poles are shown as 16e and 18e. This pair of the second supplementary stator poles 16e–18e is arranged to face each other against the rotor shaft and in the vicinity of the dynamic stable position DC of the rotor 10. This second supplementary stator poles 16e–18e have wider air gaps than the main stator poles and the first supplementary stator poles, whereby the rotor receives a predetermined braking force when the rotor 10 rotaes to pass over the dynamic stable position DC. Thus, the requested braking action can be simply obtained with the composition of stator poles themselves without any use of braking power by the drive signals as are shown at B in FIG. 1 of the prior art device. Therefore, according to the present invention, the rotor 10 receives an adequate braking force after it rotates to pass over the dynamic stable position DC and well balanced accelerating and braking actions make it possible to perform the smooth self-starting action and the continuous speed rotation after its start.

In the present invention, the above mentioned rotor 10 having a pair of rotor poles establishes one each of the static stable position SC and the dynamic stable position DC of the rotor 10, whereby the self-starting direction is fixed to one direction, for example, the self-starting rotation is always performed clockwise in the embodiment, and stable rotation can be obtained during the continuous speed operation.

As described heretofore, according to the present invention, extremely smooth self-starting rotation can simply be accomplished without using the conventional damper or having complicated circuitry.

In the present invention, it is preferable to separately install the well-known reverse rotation preventive means so that the rotating direction of the rotor 10 is more firmly determined. On the other hand, in the embodiment, the main stator poles and the first supplementary stator poles respectively consist of divided poles, but it is possible to make them to be single poles.

The air gap of the respective stator poles consists of the relation of a b c d e in the embodiment and each value for the air gaps in the embodiment is determined such that the main stator pole air gap a is 1.2 mm; the first supplementary stator pole b, 1.24 mm and c, 1.3 mm; and the second supplementary stator pole air gap d, 1.35 mm and e, 2.1 mm, to provide the preferable self-starting rotation.

As described hereinabove, according to the present invention, a synchronous motor device for timepiece can be provided with extremely stable self-starting rotation.

A driver in accordance with the embodiment of the present invention will be hereinafter described.

At first, an object of the driver in the embodiment is such that a synchronous motor for timepiece can rotate in the stable and synchronous conditions in which the syncronous motor for timepiece cannot be when the rotation is changed from its self-starting rotation to its normal rotation.

In order to obtain such stable and synchronous rotating conditions it is determined that the drive pulses should not decreased by nearly 40 percent at one time, as was done in the prior art device, but gradually reduced in steps.

Figure 7:
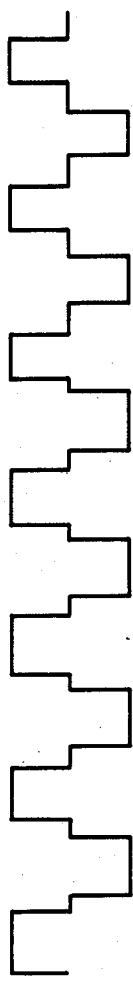
FIG. 7 A and B is a timing chart showing drive pulses and electric current waveform in such case that the decreasing width of the drive pulses is limited to 20 percent.
Figure 7:
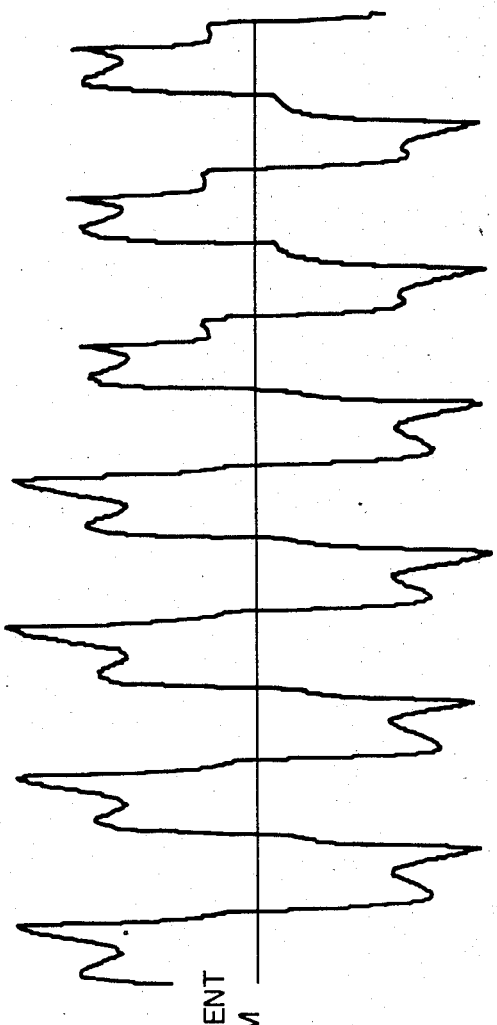

According to experimental results, it is understood that a synchronous motor rotates with the stable and synchronous rotating conditions when the drive pulses are reduced at each step within the region not exceeding 20 percent of the supplied largest pulse width. In FIG. 7 (a) shown therein is a timing chart of the drive pulses supplied with the 20 percent reduction of the pulse width in a certain period after the self-starting rotation of the synchronous motor and FIG. 7 (b) is a timing chart showing the electric current waveform flowing through the motor coil when the drive pulses illustrated in FIG. 7 (a) are supplied to the synchronous motor for a timepiece. As shown in FIG. 7, the synchronous motor rotates in the synchronous conditions when the width of the drive pulses is reduced by 20 percent.

Accordingly, the object described above is accomplished with a driver in accordance with the embodiment which gradually reduces the width of the drive pulses being generated in a certain period after the self-starting rotation of the motor and being wider than the width of the normal pulse to the width of the normal drive pulses in steps, and reduces the width of the drive pulses at each step within the region not exceeding 20 percent of the widest width among the supplied drive pulses.

Figure 8:
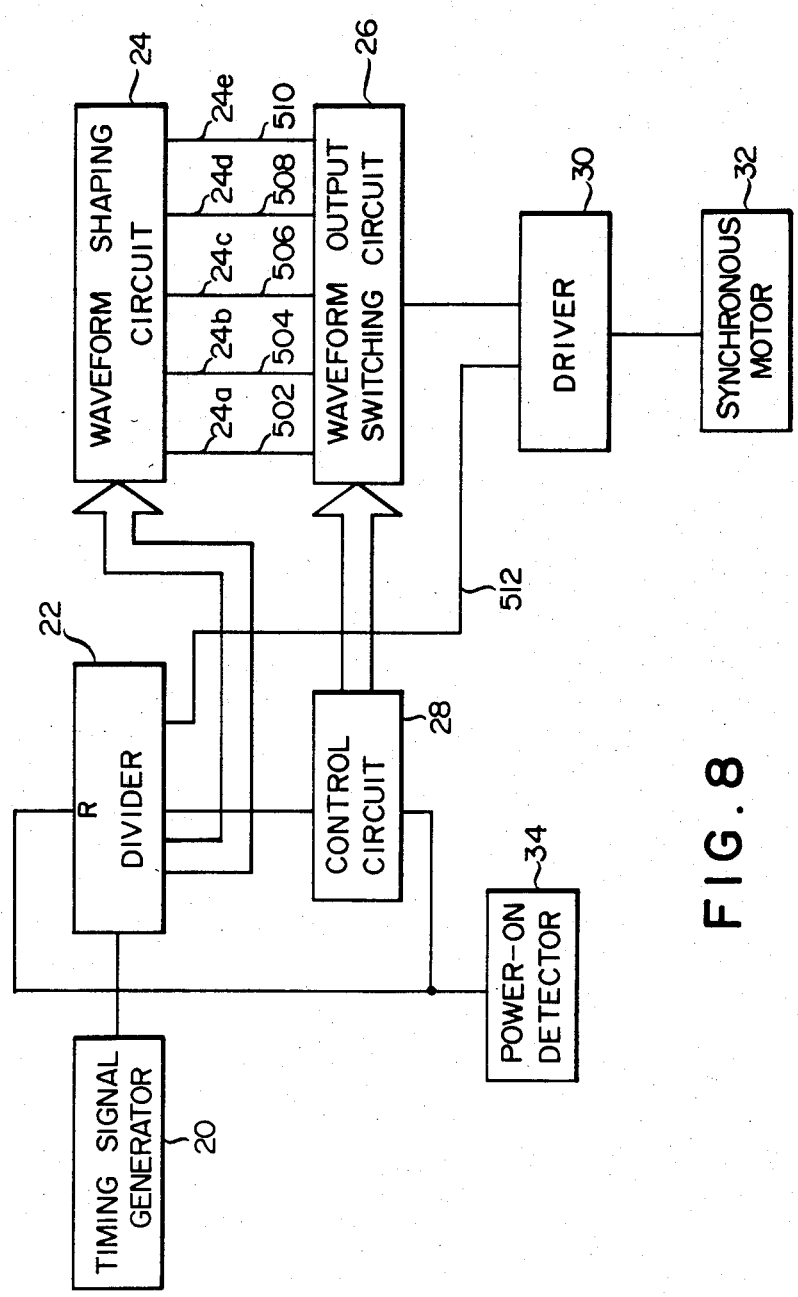
FIG. 8 is a driver of a synchronous motor device for timepiece in the preferred embodiment of the present invention.
Figure 9:
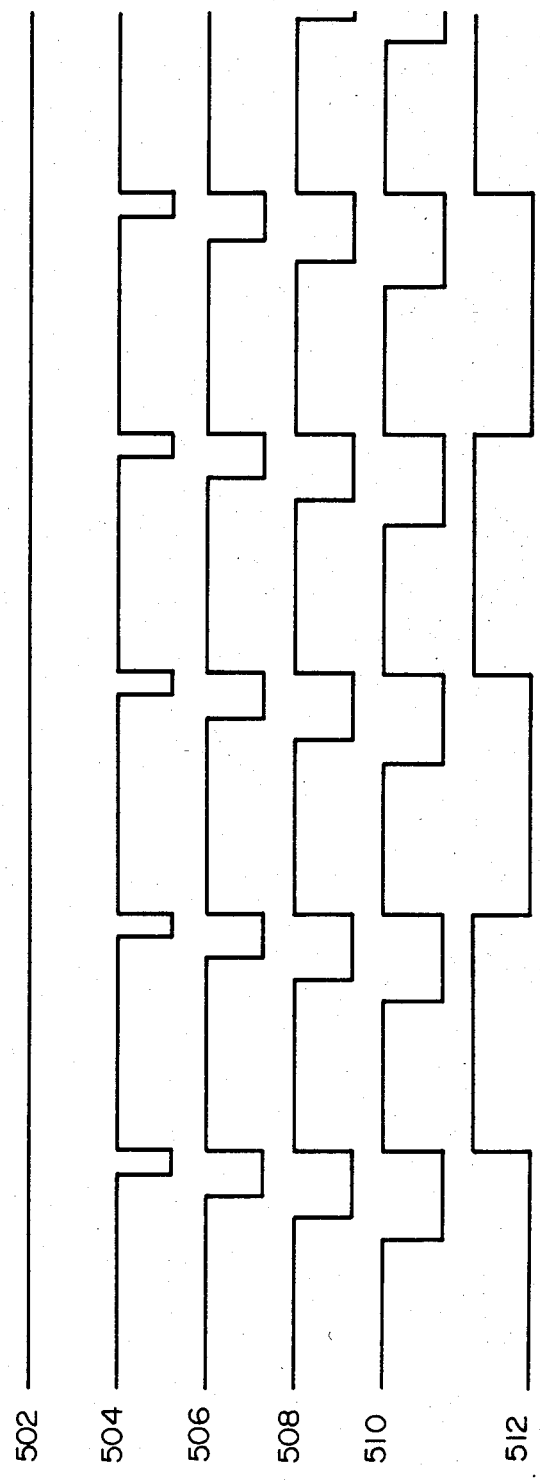
FIGS. 9 and 10 are timing charts of the circuit shown in FIG. 8.
Figure 10:
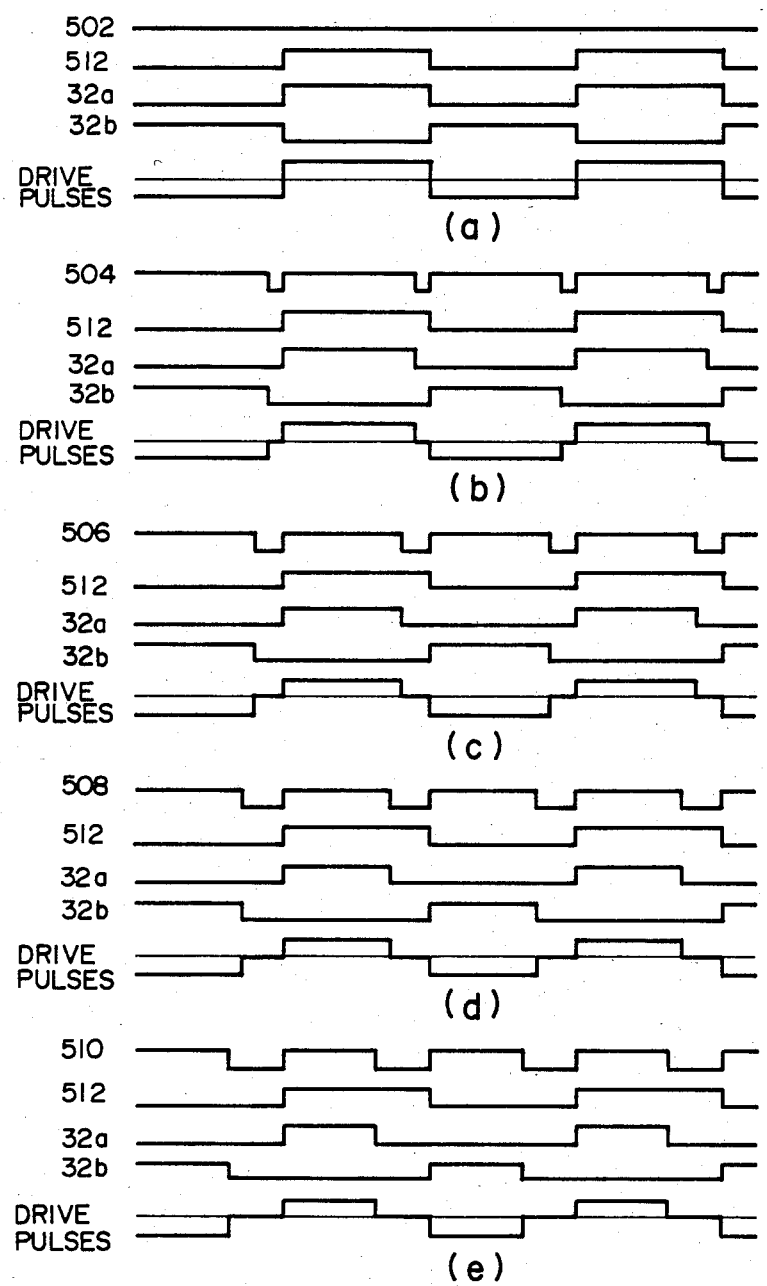

In FIG. 8 shown therein is the driver in accordance with the embodiment and FIGS. 9 and 10 show its timing charts.

In this embodiment, the wide width of the drive pulses generated in only a certain period after the power is switched on is gradually reduced at steps. The pulse width in each steps is reduced by 100 percent (the alternating pulse) at first and then by 90.6 percent, 81.3 percent, 71.9 percent and 62.5 percent finally. About 10 percent of the initially supplied drive pulses are reduced at each step.

In FIG. 8 a timing signal generator 20 generates a timing signal for a display of the time and a divider 22 divides this timing signal supplied by the timing signal generator 20 into a certain frequency. A waveform shaping circuit 24 forms the pulse signals which decide the reducing width of the drive pulses based upon the predetermined frequency signal from the divider 22 to output through the lines 24a through 24e.

In FIG. 9 shown therein are the output signals generated through the lines 24a through 24e. The output signal 502 generated through the line 24a is a signal "H" normally. The output signal 504 generated through the line 24b is a 16 Hz signal with a pulse duty ratio of about 90.6 percent and the output signal 508 generated through the line 24d is a 16 Hz signal with a pulse duty ratio of 62.5 percent.

The output signals 502 through 520 generated through the lines 24a through 24e are input to a waveform output switching circuit 26, which selects either one of the output signals 502 through 510 from the lines 24a through 24e based upon the signal from a control circuit 28 to output to the driver 30. The control circuit 28 has the waveform output switching circuit 26 output to the driver 30 in the orders of the output signals 502, 504, 506 and 508 through the lines 24a, 24b, 24c and 24d, and, afterwards, has the output signal 510 output succeedingly through the line 24e. The driver 30 inputs a 8 Hz signal from the divider 22, and alternately separates the pulse signal from the waveform output switching circuit 26 to supply the both ends 32a and 32b of the coil of the synchronous motor for timepiece 32 with the 8 Hz signal as the basis. On the other hand, a power-on detector is coupled with the reset input R of the divider 22 and the control circuit 28 so that the connection to the power source consisting of the battery, not illustrated, can be detected and makes the divider 22 and the control circuit 28 be put in the initial stage.

The operation of the circuits mentioned above will be hereafter described.

When the power source consisting of the battery is switched on to be connected, the power-on detector 34 detects such and puts the divider 22 and the control circuit 28 in the initial stage, whereby the control circuit 28 makes the waveform output switching circuit 26 select the "H" signal of the output signal 502 out of the output signals 502 through 510 supplied from the waveform shaping circuit 24. Furthermore, the driver 30 is supplied the 8 Hz signal 512 and output signal 502, and outputs a 8 Hz signal with a pulse duty ratio of 50 percent to both of the coil ends 32a and 32b of the synchronous motor 32 as is shown in FIG. 10 (a). As a result, the drive pulses applied to the synchronous motor for timepiece 32 become alternating pulses with a wide pulse width as is shown in FIG. 10 (a).

After such supply, at every lapse of 0.375 second the control circuit 28 makes the waveform output switching circuit 26 select a 16 Hz signal of the output signal 504 with a pulse duty ration of 90.6 percent at first, and succeedingly a 16 Hz signal of the output signal 506 with a pulse duty ratio of 81.3 percent, and then a 16 Hz signal of the output signal 508 with a duty ratio of 71.9 percent. The driver 30 alternately supplies a 8 Hz signal with a pulse duty ratio of 45.3 percent at first as is shown in FIG. 10 (b), and succeedingly a 8 Hz signal with a pulse duty ratio of 40.65 percent as is shown in FIG. 10 (c), and then a 8 Hz signal with a pulse duty ratio of 35.95 percent as is shown in FIG. 10 (d) to both of the coil ends 32a and 32b of the synchronous motor for timepiece 32 based upon the signals of the output signals 504, 506 and 508 and the 8 Hz signal 512. Consequently, the drive pulses applied to the synchronous motor for timepiece 32 become the drive pulses with the pulse duty ratio of 90.6 percent as is shown in FIG. 10 (b) and succeedingly, the one with the pulse duty ratio of 81.3 percent as is shown in FIG. 10 (c), and then the one with the pulse duty ratio of 71.9 percent as is shown in FIG. 10 (d).

When 0.375 seconds after the drive pulses of FIG. 10 (d) is applied has passed the control circuit 28 makes the waveform output switching circuit 26 select the 16 Hz signal of the output signal 510 with the pulse duty ratio of 62.5 percent. Consequently, the drive pulses applied to the synchronous motor for timepiece 32 become the drive pulses with the pulse duty ratio of 62.5 percent which has a necessary and sufficient pulse width for normal continuous speed rotation of the synchronous motor for timepiece 32 as is shown in FIG. 10 (e).

Figure 11:
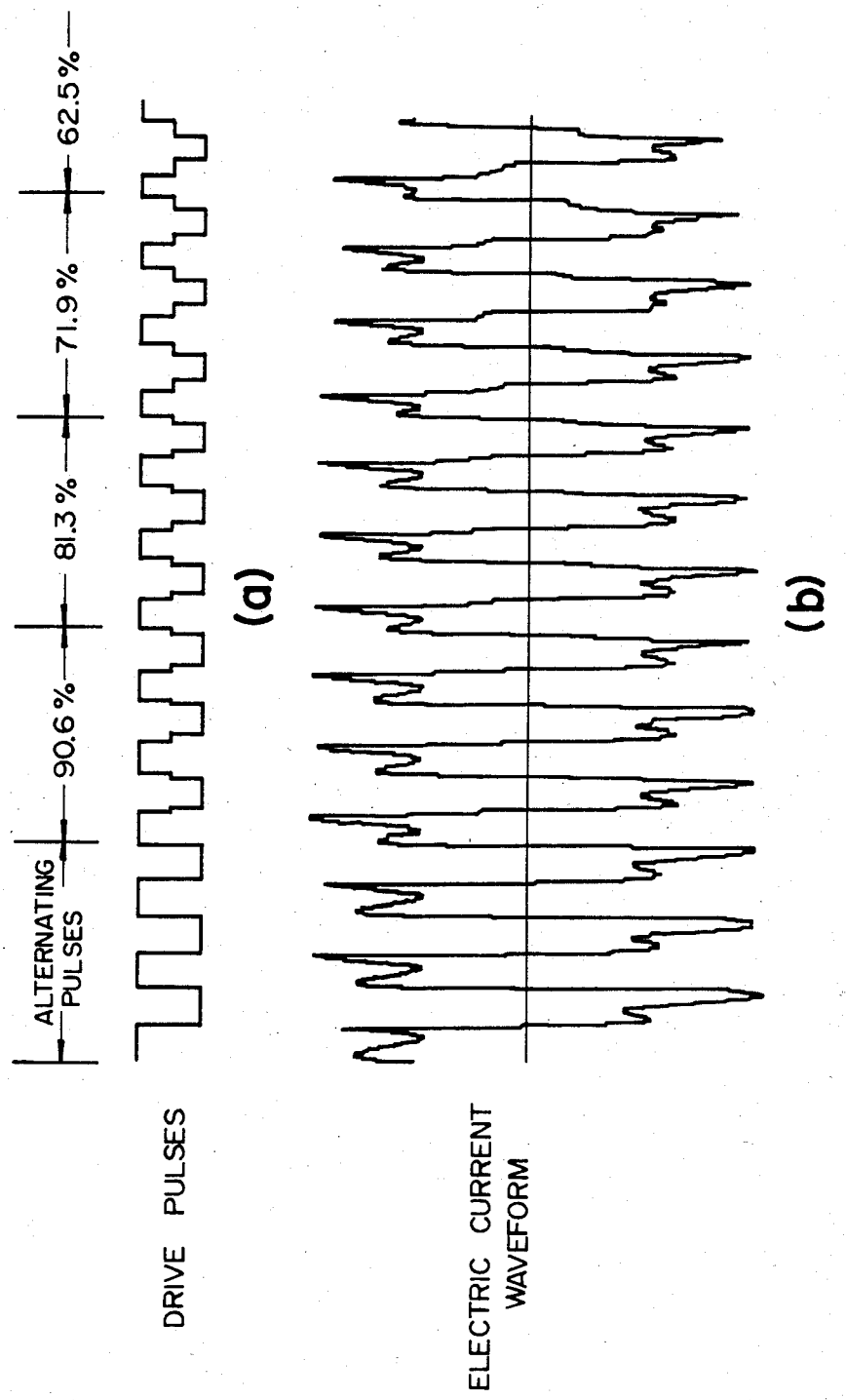
FIG. 11 A and B is a timing chart showing the drive pulses and electric current waveform in the circuit shown in FIG. 8.
Figure 12A:
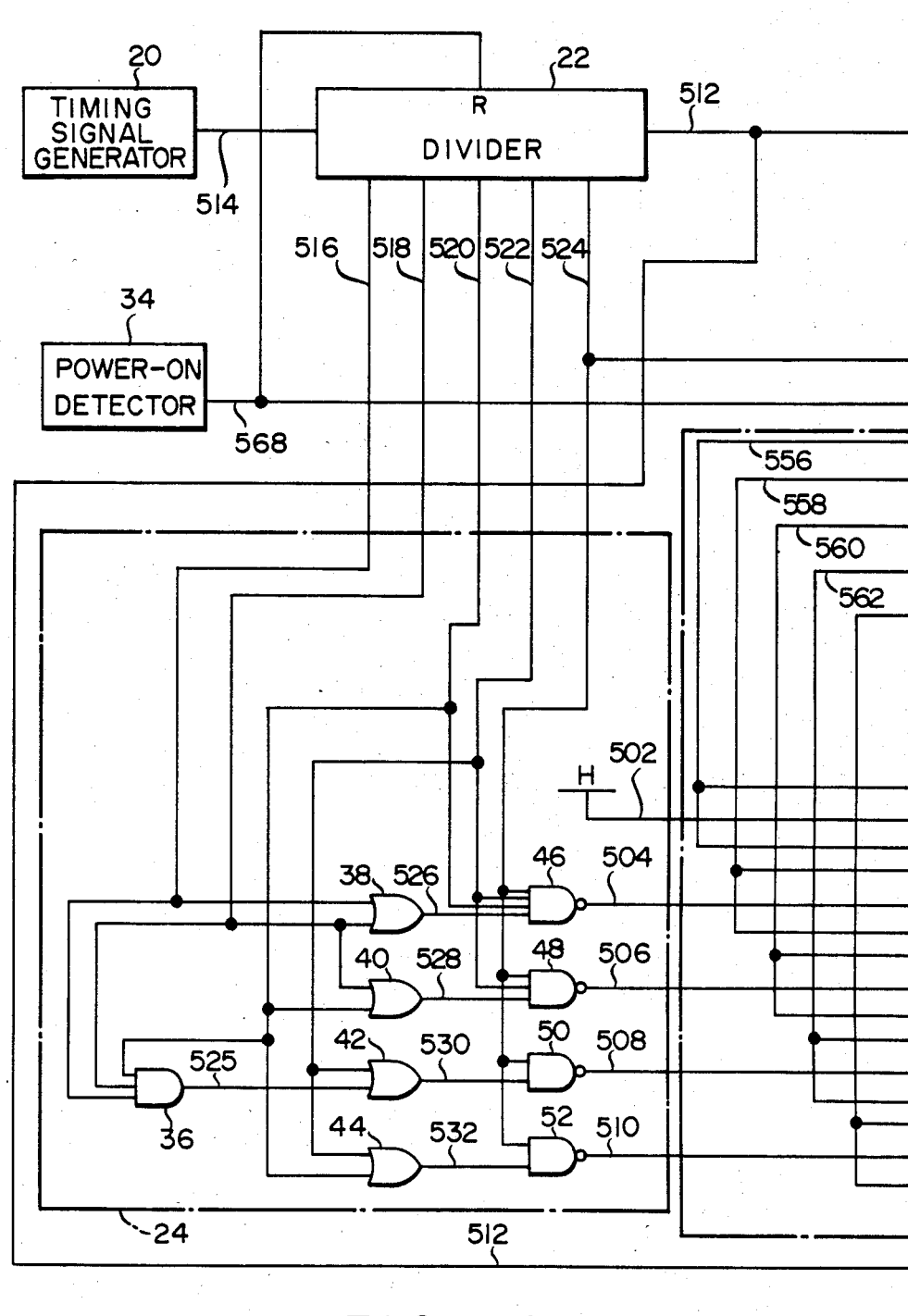
Figure 12B:
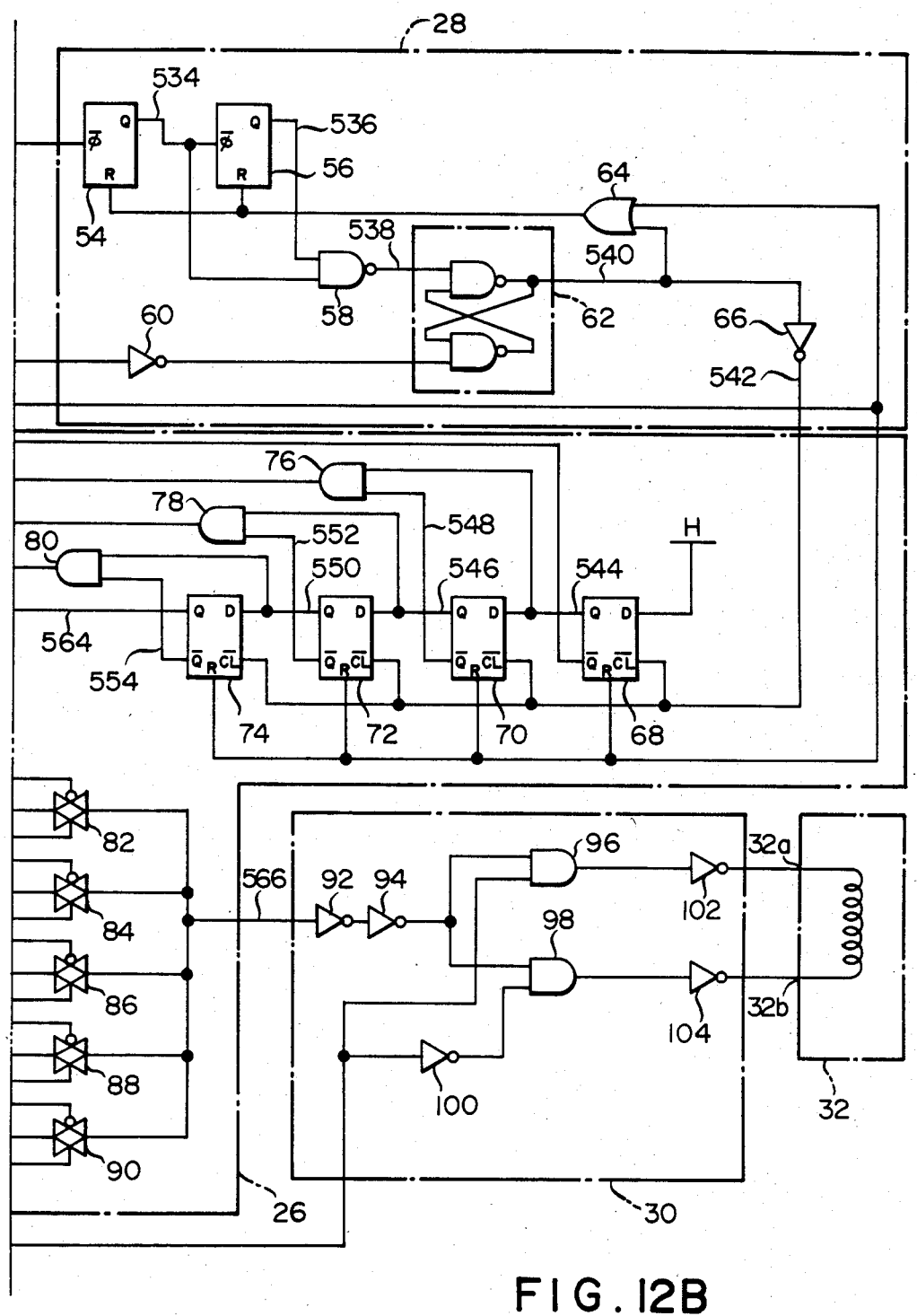

Thus, the drive pulses applied to the synchronous motor for timepiece lowers its pulse width every 0.375 seconds after the power source of battery is switched on, as is shown in FIG. 11 (a), and finally become the drive pulses with the necessary pulse width for normal continuous speed rotation. The waveform of the electric current flowing through the coil of the synchronous motor for timepiece 32 becomes the one shown in FIG. 11 (b), and it is understood that the rotor of the synchronous motor for timepiece 32 rotates with smooth and synchronous rotation. Accordingly, even if another load is charged, when the power source of battery is switched on, the motor starts firmly in the synchronous state. After starting of the motor, it rotates with the same small consumption of the power as the prior art device since the drive pulses are narrowed enough and necesarily to make normal continuous speed rotation.

In this embodiment, it is the time of power-on when the pulse width of the drive pulses is gradually narrowed to the normal drive pulses, but the present invention can be used at the other motor starting time, for example, after the second hand steps or after zero second return. Furthermore, in this embodiment, the pulse width of the drive pulses is decreased in five steps of 100 percent (the alternating pulse), 90.6 percent, 81.3 percent, 71.9 percent and 62.5 percent every 0.375 second, and the changing step numbers and the pulse decreasing width at every step can be freely determined within the region of not exceeding 20 percent of the widest pulse width among the supplied drive pulses.

As described heretofore, according to the driver inaccordance with the embodiment of the present invention, in the driver of the synchronous motor for timepiece generating wider drive pulses than the normal drive pulses only for a certain period after its starting time, unstable and non-synchronous rotation of the synchronous motor for timepiece provided at the time of switch-on from motor starting rotation to normal speed rotation in the prior art device can be prevented by means of gradually decreasing the drive pulses with wide pulse width to the ones with normal pulse width and limiting the pulse decreasing width at every step within the region of not exceeding 20 percent of the widest pulse width among the supplied drive pulses. In the normal speed rotation of the motor, it rotates with the same small consumption of the electric power as the prior art device since the drive pulses are supplied with the pulse width necessary and sufficient for normal continuous speed rotation.

The driver will be hereinafter described with more details according as the embodiment.

Figure 12:
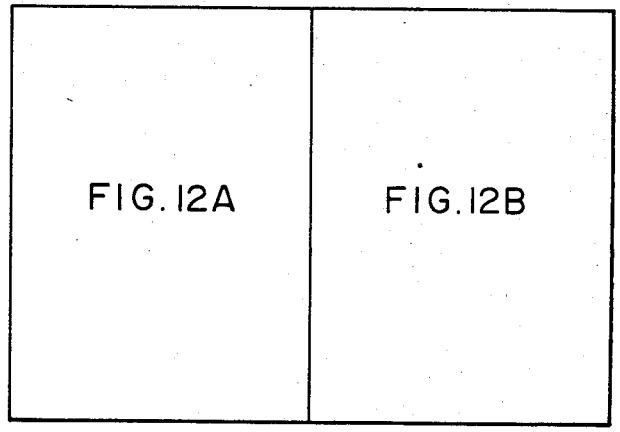
FIG. 12 A and B is a circuit diagram showing the driver of the embodiment in details.
Figure 13:
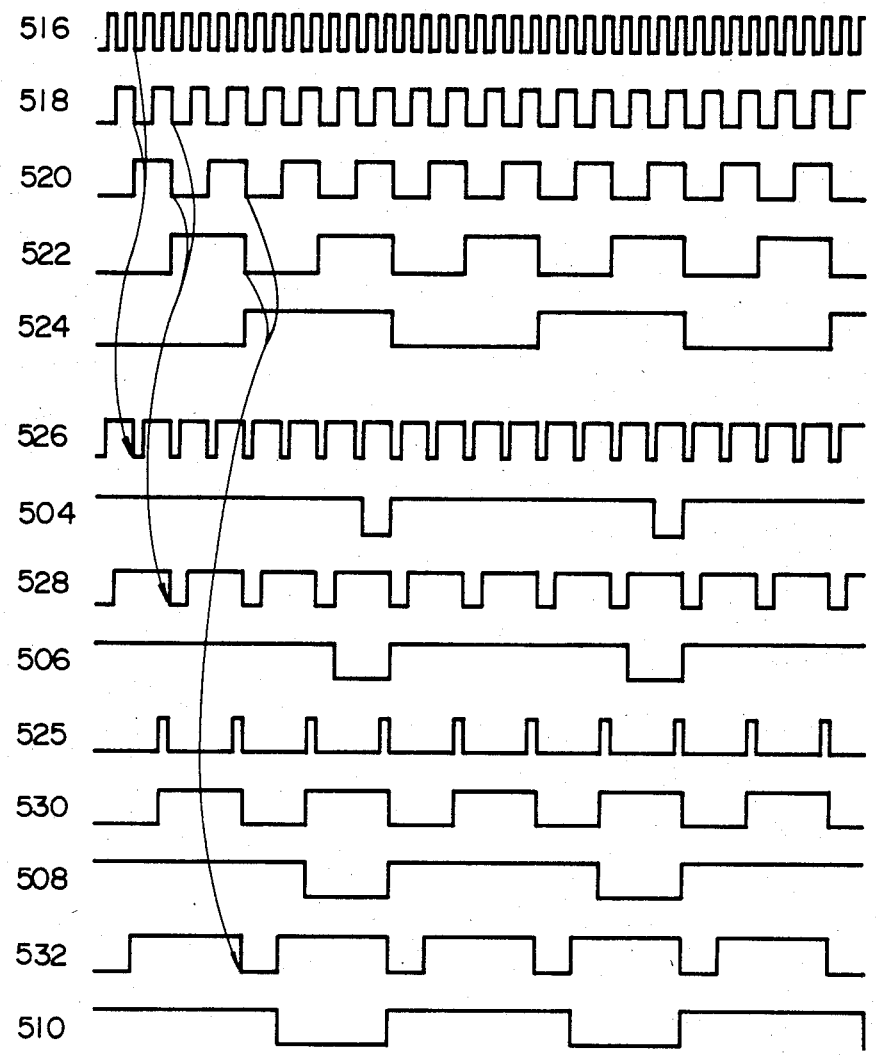
FIGS. 13 and 14 are timing charts of FIG. 12.
Figure 14:
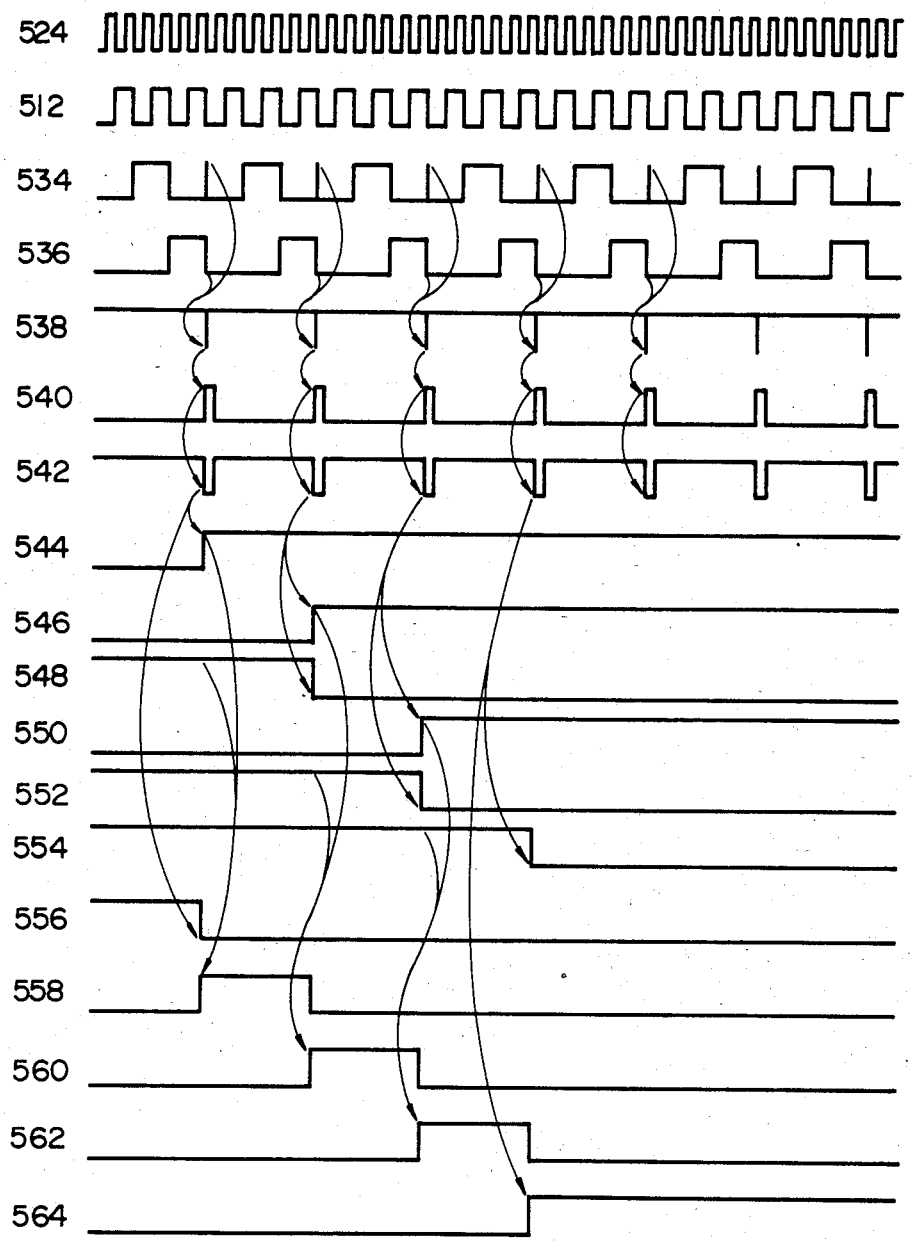

In FIG. 12 shown therein is the driver in details in accordance with the embodiment and FIGS. 13 and 14 show the timing charts of the driver illustrated in FIG. 12.

In FIG. 12 the timing signal 514 is supplied from the timing signal generator 20 to the divider 22 which outputs a 256 Hz signal 516, a 128 Hz signal 518, a 64 Hz signal 520, a 32 Hz signal 522, a 16 Hz signal 524, and a 8 Hz signal 512. Each of the signals 516, 518, 520, 522 and 524 is supplied to the waveform shaping circuit 24 and receives predetermine wave form shaping action.

The waveform shaping circuit 24 includes an AND circuit 36, OR circuits 38, 40, 42 and 44, and NAND circuits 46, 48, 50 and 52. The signal 525 is supplied from the AND circuit 36 to the OR circuits 42, and the signals 526, 528, 530 and 532 from the OR circuits 38, 40, 42 and 44 are respectively supplied to one end of the NAND circuits 46, 48, 50 and 52 which respectively output the signals 504, 506, 508 and 510. On the other hand, the waveform shaping circuit 24 outputs the signal 502 from the circuit, not illustrated.

Accordingly, the waveform shaping circuit 24 outputs the signals 502, 504, 506, 508 and 510, and the waveforms of the output signals 504, 506, 508 and 510 are shown in FIG. 13. The output signal 502 is not shown in FIG. 13 but always carries a "H" level signal.

The 8 Hz signal 512 supplied from the driver is supplied to the control circuit 28 so that the control circuit 28 can perform a predetermined control action. The control circuit 28 includes Flip-Flop circuits (hereinafter referred as FF) 54 and 56, a NOT circuit 60, an RS Flip-Flop 62, an OR circuit 64 and a NOT circuit 66. The signal 534 from the FF 54 is supplied to FF 56 as well as to the one end of the NAND circuit 58, and the signal 536 is supplied from the FF 56 to the other end of the NAND circuit 58. The signal 538 is supplied from the NAND circuit 58 to the RS Flip-Flop 62. To the other end of the RS Flip-Flop 62, a 16 Hz signal 524 is supplied after invertion at the NOT circuit 60, and the signal 540 from the RS Flip-Flop is inverted at the NOT circuit 66. The control signal 542 is outputted from the above mentioned NOT circuit 66. In FIG. 14 shown therein are waveforms of the signals 534, 536, 538, 540 and 542, and operation of the control circuit 28 can be understood through the timing charts in FIG. 14.

The waveform output switching circuit 26 is provided in order to select one of the output signals 502, 504, 506, 508 and 510 based upon the signal 542 supplied from the control circuit 28. The waveform output switching circuit 26 includes four stages of FF 68, 70, 72 and 74, AND circuits 76, 78 and 80, and switching elements 82, 84, 86, 88 and 90, and the signal 542 is supplied from the control circuit 28 to the FF's 68, 70, 72 and 74. The FF 68 outputs the signal 556, and the signal 544 from the FF 68 and the signal 548 from the FF 70 are supplied to the AND circuit 76, which outputs the signal 558. The signal 546 from the FF 70 and the signal 552 from the FF 72 are supplied to the AND circuit 78, which outputs the signal 560. The signal 550 from the FF 72 and the signal 554 from the FF 74 are supplied to the AND circuit 80, which outputs signal 562. Furthermore, the FF 74 outputs the signal 564.

The signals 556, 558, 560, 562 and 564 are respectively supplied to the switching elements 82, 84, 86, 88 and 90, and further, the output signals 502, 504, 506, 508 and 510 are respectively supplied from the above mentioned waveform shaping circuit 24 to the switching elements 82, 84, 86, 88 and 90. The output signals 502, 504, 506, 508 and 510 respectively receive the predetermined switching action with the signals 556, 558, 560, 562 and 564 as the basis. In other words, the output signals from the switching elements 82, 84, 86, 88 and 90 are integrated to be a signal 556. This signal 556 becomes the waveform by the order of the output signals 502, 504, 506 and 508 through the switching action of the switching elements 82, 84, 86, 88 and 90, and afterwards, the waveform of the output signal 510 is continued on. In FIG. 14 shown therein are the waveforms of the signals 544, 546, 550, 552 and 554 and the signals 556, 558, 560, 562 and 564. The waveform of the signal 556 supplied from the waveform output switching circuit 26 can be understood by consideration of the waveforms in FIG. 14 together with the waveforms in FIG. 13.

The driver 30 is provided in order to alternately and separately supply the signal 566 from the wave form output switching circuit 26 to both ends 32a and 32b of the synchronous motor for timepiece 32 with the 8 Hz signal 512 as the basis. The driver 30 includes NOT circuits 92 and 94, AND circuits 96 and 98, a NOT circuit 100 and NOT circuits 102 and 104. The signal 566 is supplied from the waveform output switching circuit 26 to the one end of the AND circuits 96 and 98 by way of the NOT circuits 92 and 94. On the other hand, the 8 Hz signal 512 is supplied to the other end of the AND circuit 96, and further, to the other end of the AND circuit 98 after the invertion at the NOT circuit 100. The signals from the AND circuits 96 and 98 are respectively supplied to both ends of 32a and 32b of the synchronous motor for timepiece 32 after the invertion at the NOT circuits 102 and 104.

Accordingly, the driver 30 can alternately and separately supply the signal 566 from the waveform output switching circuit 26 to both coil ends 32a and 32b of the synchronous motor for timepiece 32. Since the drive pulses with wide pulse width are gradually decreased at every step by not more than 20 percent of the widest pulse width among the supplied drive pulses, unstable and non-synchronous rotation provided at the time of switch-on from motor starting rotation to normal speed rotation can be easily prevented. This is evident from the waveform charts in FIGS. 10 and 11.

In order to put the divider, the waveform output switching circuit 26 and the control circuit in the initial stage, when the power source of battery is switched on, the power-on detector 34 is provided. The reset signal 568 is supplied from the power-on detector 34 to the reset terminal of the divider 22 and to the reset terminals of the FF's 68, 70, 72 and 74 in the waveform output switching circuit 26, and further, supplied to the reset terminals of the FF's 54 and 56 by way of the OR circuit 64 in the control circuit 28. Accordingly, when the power source of battery is switched on, the reset signal 518 resets the divider 22 and the FF's 68, 70, 72 and 74 in the waveform output switching circuit 26, and further, the FF's 54 and 56 in the control circuit 28.

As described heretofore, according to the driver shown in FIG. 12, unstable and non-synchronous rotaion of the rotation of the synchronous motor for timepiece provided at the time of switched on from its starting rotation to normal speed rotation can be easily prevented.

As described hereinabove, the present invention can provide a synchronous motor device for a timepiece having extremely stable self-starting rotation.

What is claimed is:

1. A synchronous motor device for timepiece including a synchronous motor for timepiece having:
   a rotor having a pair of magnetized rotor poles around its circumference;
   a stator consisting of a pair of stator plates having a plurality of stator poles arranged around the vicinity of said rotor with separation of air gap; and
   an energizing coil supplying alternating magnetic flux to said stator;
   wherein said synchronous motor for timepiece comprises:
   main stator poles being prepared with both of the stator poles at the facing position against the rotor shaft and mainly forming a static stable position of the rotor;
   first supplementary stator poles being facingly positioned against the rotor shaft, being prepared with both of the stator poles at separate position from said main stator poles, forming a dynamic stable position of the rotor with the cooperation of said main stator poles, and having wider airgaps than said main stator poles; and
   second supplementary stator poles being facingly positioned against the rotor shaft, being prepared in the vicinity of the dynamic stable position of the rotor in order to place a predetermined braking force on the rotor which rotates over the dynamic stable position, having wider air gaps than said main stator poles and said first supplementary stator poles;
   whereby smooth self-starting rotation can be achieved.

2. Asynchronous motor device for timepiece according to claim 1, wherein said main stator poles consist of divided poles.

3. A synchronous motor device for timepiece according to claim 1, wherein said first supplementary stator poles consist of divided poles.

4. A synchronous motor device for timepiece including a synchronous motor for timepiece having:
   a rotor having a pair of magnetized rotor poles around its circumference;
   a stator consisting of a pair of stator plates having a plurality of stator poles arranged around the vicinity of said rotor with separation of air gap; and
   an energizing coil supplying alternating magnetic flux to said stator;
   wherein said synchronous motor for timepiece comprises:
   main stator poles being prepared with both of the stator poles at the facing position against the rotor shaft and mainly forming static stable position of the rotor;
   first supplementary stator poles being facingly positioned against the rotor shaft, being prepared with both of the stator poles at the separate position from said main stator poles, forming the dynamic stable position of the rotor with the cooperation of said main stator poles, and having wider air gaps than said main stator poles; and
   second supplementary stator poles being facingly positioned against the rotor shaft, being prepared in the vicinity of the dynamic stable position of the rotor in order to place predetermined braking force on the rotor which rotates over the dynamic stable position, having wider air gaps than said main stator poles and said first supplementary stator poles; and further
   said synchronous motor device for timepiece comprises:
   a detector detecting the time of said synchronous motor for timepiece starting its rotation, and since then for certain period driving said synchronous motor for timepiece at constand speed rotation with the drive pulses of wider pulse width than normal pulse width, and further gradually decreasing at steps the pulse width of the drive pulses generated within a certain period after said motor's starting its rotation into the pulse width of the normal drive pulses within the region of not exceeding 20 percent of the widest pulse width among the supplied drive pulses.

5. A synchronous motor device for timepiece according to claim 4, wherein said detector detects the switch-on time of power source of battery.

* * * * *